United States Patent [19]
Kurita et al.

[11] 3,829,179
[45] Aug. 13, 1974

[54] BEARING DEVICE FOR VERTICAL-SHAFT ROTARY MACHINES

[75] Inventors: Seiichi Kurita, Takahagi; Makoto Kaneko; Mituo Iikawa, both of Hitachi, all of Japan

[73] Assignee: Hitachi, Ltd., Tokyo, Japan

[22] Filed: Mar. 2, 1973

[21] Appl. No.: 337,367

[30] Foreign Application Priority Data
Mar. 3, 1972 Japan.............................. 47-21517

[52] U.S. Cl. ............................................. 308/160
[51] Int. Cl. .......................................... F16c 17/06
[58] Field of Search.................................... 308/160

[56] References Cited
UNITED STATES PATENTS
1,806,062   5/1931   Howarth............................ 308/160
2,191,901   2/1940   Wallgren............................ 308/160

*Primary Examiner*—Charles J. Myhre
*Assistant Examiner*—Frank Susko
*Attorney, Agent, or Firm*—Craig & Antonelli

[57] ABSTRACT

A bearing device comprising a bearing that supports the overall weight of the rotating parts of a vertical-shaft rotary machine and another associated rotary machine or machines and also bears downward thrust during operation, a bearing that controls radial displacement of the rotating parts, and a bearing that bears up-thrust, or a thrust acting in the direction opposite to the direction for the first bearing. Of these bearings, those for controlling the radial displacement and for bearing the up-thrust are disposed close to each other to permit a reduction in the overall shaft length of the rotary machines and make the machines as a whole small in size and compact in construction.

17 Claims, 7 Drawing Figures

BEARING DEVICE FOR VERTICAL-SHAFT ROTARY MACHINES

BACKGROUND OF THE INVENTION

Vertical-shaft rotary machines, for example induction motors designed and built with vertical shafts for driving pumps, have at the top of the casing a thrust bearing to support the weight of the rotor and of the runner of a pump, and also have a pilot bearing to keep the rotor from being radially displaced into contact with the stator. The thrust bearing and pilot bearing are accommodated in a common enclosure filled with lubricating oil. If the pump connected to the induction motor is installed in a location where it is subjected to a pressure greater than the atmospheric pressure, the pressure works on the runner shaft of the pump and urges the rotor of the induction motor up ward. This force, known as up-thrust, necessitates the provision of an up thrust bearing in addition to the two bearings already mentioned. In this case a total of three bearings are contained in the oil-filled enclosure.

These bearings are mounted on the rotating shaft in three stages, namely, the thrust bearing up-thrust bearing, and pilot bearing, in the ascending order, and are secured in position with support members independently of one another. The presence of the bearings, of course, extends the overall length of the shaft accordingly.

The increase in the shaft length is naturally accompanied by an expansion of the overall size of the induction motor and a reduction of its critical speed. Especially where a pump-driving induction motor of this character is used with a recycling pump for a nuclear reactor, the surrounding equipment places very strict limits upon the space to be occupied by the motor when installed. Since the introduction of smaller and smaller units to surround the nuclear reactor has been strongly called for, the installation of a motor with a long rotating shaft is an attempt against the tendency for miniaturization. It simply occupies more of the valuable space around the reactor. The same is true with other installations. Furthermore, a decrease in the critical speed of an induction motor leads to development of vibration or other undesirable phenomenon at low motor speed. When this happens, the induction motor will fail to run up to its capacity and its reliability will be adversely affected.

Because the three bearings are individually supported by separate members, the oil-filled enclosure that accommodates them is made so large that it, in turn, must be supported with rugged members. This is also responsible for the construction of large-size induction motors. In addition, the three different bearings, supported by stationary members, are extremely difficult to overhaul and necessitates much time and labor for their disassembling and reassembling.

SUMMARY OF THE INVENTION

It is an object of the present invention to provide a bearing device for vertical-shaft rotary machines which permits a reduction in the length of the rotating shaft of such a machine.

Another object of the invention is to provide a bearing device for vertical-shaft rotary machines which is easy to handle.

Still another object of the invention is to provide a bearing device for vertical-shaft rotary machines which is small in size and compact in construction.

These and other objects of this invention will become apparent from the following description taken in conjunction with the accompanying drawings showing embodiments thereof.

Briefly, the present invention is characterized in that, in a bearing device including a thrust bearing to bear the thrust of a vertical-shaft rotary machine, an up-thrust bearing to bear upward thrust, and a pilot bearing to restrict radial displacement, the said up-thrust bearing and pilot bearing are disposed adjacent to each other and are supported by common stationary members.

DETAILED DESCRIPTION

Figure 1:
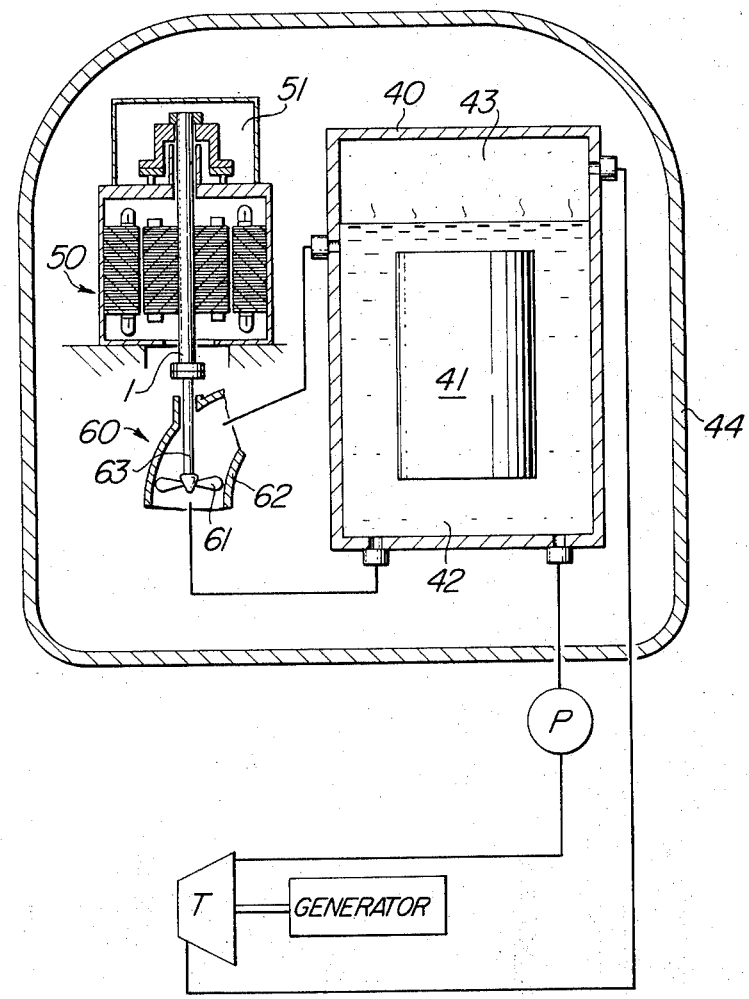
FIG. 1 is a schematic view illustrating a nuclear reactor and surrounding equipment.

The present invention will now be described in detail in connection with the accompanying drawing showing embodiments thereof. Referring specifically to FIG. 1, there is diagrammatically illustrated a nuclear reactor for a power plant as comprising a pressure vessel 40 in which nuclear fuel 41 and water 42 are enclosed, a recycling pump 60 for circulating water through the pressure vessel 40, an induction motor 50 of vertical type for driving the pump 60, and a turbine T for driving a generator with the steam 43 produced in the pressure vessel 40. Of those components, the pressure vessel 40, induction motor 50, and recycling pump 60 are accommodated in a common vessel 44.

While the plant is in operation the pressure in the pressure vessel 40 and recycling line 62 may rise up to 60 – 70 kilograms per square centimeter. The pressure works on the shaft 63 for the pump runner 61 to urge the same out of the line 62. This urging creates an upward thrust on the rotating shaft 1 of the induction motor 50.

To absorb this thrust, the bearing device 51 of the induction motor 50 is equipped with an up-thrust bearing.

Figure 2:
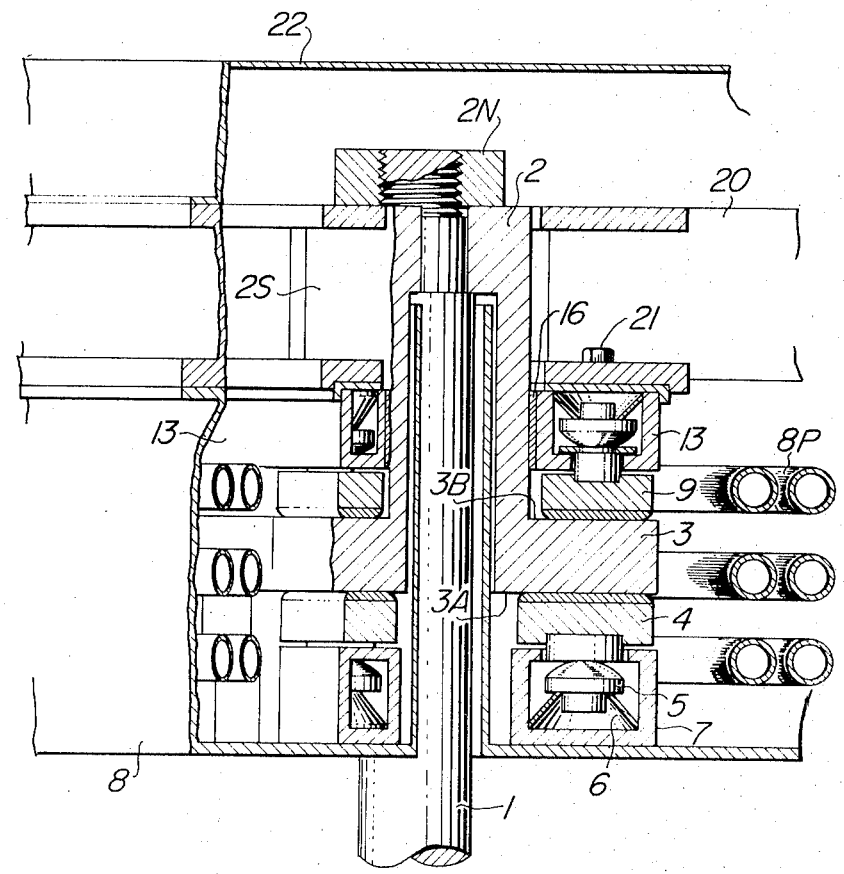
FIG. 2 is an enlarged side view of a bearing device for vertical-shaft rotary machine according to this invention, partly broken away.
Figure 3:
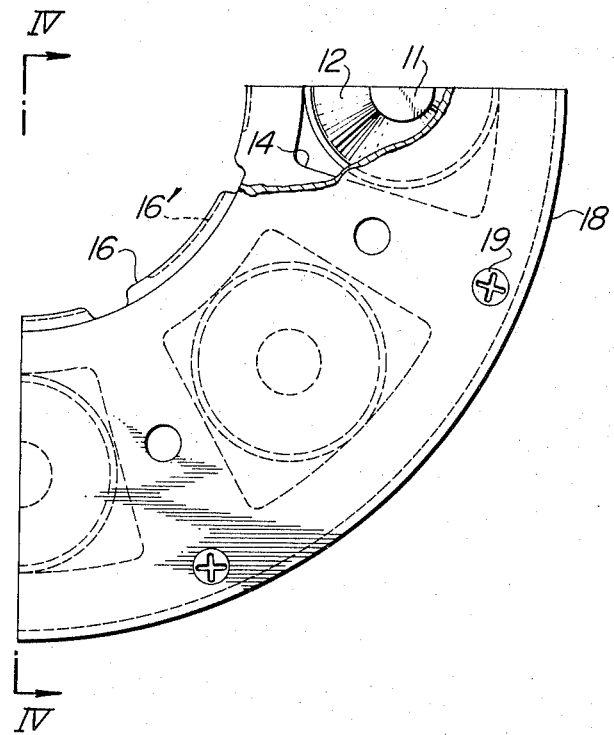
FIG. 3 is an enlarged plan view of a part of pilot bearing shown in FIG. 2.
Figure 4:
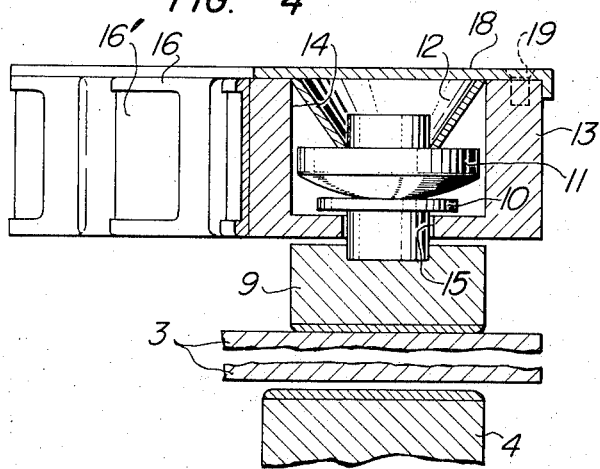
FIG. 4 is a sectional view taken along the line IV—IV of FIG. 3.

A bearing device of such construction made in accordance with this invention will be described in more detail hereunder with reference to FIGS. 2 to 4. On the upper end of the rotating shaft 1 that carries the rotor of the induction motor and the runner of the recycling pump therebelow, a shaft collar 2 is mounted and secured in position with a nut 2N. The shaft collar 2 is in the form of a cylinder concentric with the shaft 1, with the upper end of the cylinder fastened to the shaft and the lower end provided with a horizontal disk-shaped bearing runner 3. Opposite the underside 3A of the bearing runner 3 there are disposed a plurality of thrust bearing shoes 4, each of which is supported by a shoe cage 7 with an oval-head support member 5 and a truncated cone-shaped spring 6. These components are contained in a casing 8 filled with lubricating oil. With the rotation of the shaft 1, the bearing runner 3 slides along the thrust bearing shoes 4. In order to carry off the heat developed by the sliding friction, the lubricating oil is cooled with cooling water pipes 8P disposed in the oil-filled casing 8.

Opposite the upper side 3B of the bearing runner 3 are also disposed a plurality of up-thrust bearing shoes 9. These shoes are rockably supported by an annular support member 13 arranged along the shaft collar 2, as better shown in FIG. 4. The annular support member 13 is provided with pits 14 equidistantly along its periphery. In the bottom center of each pit 14 is formed a hole 15 facing the upper side 3B of the bearing runner 3. Through this hole 15 a part of the associated up-thrust bearing shoe 9 is extended into the corresponding pit 14, and is secured to a support seal 10 which is larger in diameter than the hole 15. Constructed in this way the support seats 10 are engaged with the bottoms of the pits 14 and enable the up-thrust bearing shoes to be supported by the annular support member 13. Since each up-thrust bearing shoe 9 is partly fitted in a loose manner into the corresponding hole 15, it can be freely rocked therein.

Each pit 14 also contains an oval-bottomed support member 11 that holds a part of the up-thrust bearing shoe 9 and also an inverted truncated-cone-shaped spring 12 that elastically presses the support member 11 against the seat. Upper openings of the pits 14 are closed by an annular plate 18 secured to the annular support member 13 by set screws 19.

Along the inner periphery of the annular support member 13 is provided a pilot bearing 16 in sliding contact with the outer periphery 2S of the shaft collar 2. As shown in FIG. 4 the sliding surface of the pilot bearing 16 is formed with a groove 16' for the introduction of lubricating oil. The annular support member 13 thus provided with the pilot bearing 16 and supporting the up-thrust bearing shoes 9 is, in turn, secured by bolts 21 to a reinforcing member 20 which is formed integrally with the oil-filled casing 8.

All of the components above described are enclosed in the oil-filled casing 8 as the latter is closed with a cover 22.

With the construction above described, the bearing device according to this invention functions and operates in the manner now to be described. While a rotary machine, e.g., an induction motor for driving a pump, is out of operation, the overall weight of its rotating parts are supported by the thrust bearing shoes 4 via the shaft collar 2. While the motor is running, the overall weight of its rotating parts is supported by the thrust bearing shoes 4 and the radial displacement of those parts is suppressed by the pilot bearing 16 provided integrally with the annular support member 13. If the motor is used in an application where it is subjected to elevated pressure, for example with a recycling pump for a nuclear reactor, an upward thrust works on the rotating shaft 1. This thrust is received by the up-thrust bearing shoes 9 disposed on the upper side 3B of the bearing runner 3 and supported by the annular support member 13. The bearing device, therefore, can take up both upward and downward thrusts and control the radial displacement of the rotating parts.

The most important feature of this construction is that the up-thrust bearing shoes 9 and pilot bearing 16 are supported by the common annular support member 13, so that the both can be disposed in close proximity to each other. Accordingly, the length of the rotating shaft 1 in the bearing device can be decreased and an induction motor with a shorter shaft than heretofore is provided. The shortening of the shaft length renders it possible to build an induction motor small in size and compact in construction, which is particularly suited for applications with severe space limitations, such as for ancillary equipment of nuclear reactors.

The short rotating shaft 1 permits an increase in the critical speed of the induction motor. It not only helps the motor run up to its full capacity but also increases the reliability of its performance.

Because the up-thrust bearing shoes 9 and pilot bearing 16 are supported by the common annular support member 13, they can be disassembled and reassembled, where necessary, simultaneously with the attachment and detachment of the annular support member 13. This provides a maximum convenience in servicing, and can substantially save the time and labor otherwise required for the overhauling of those parts. Prior to their incorporation in the oil-filled casing 8, the up-thrust bearing shoes and pilot bearing 16 are preloaded in the annular support member 13 as a subassembly. Thus, the parts can be easily combined with the annular support member 13, and the sub-assembly can be accommodated in the oil-filled casing 8 as the annular support member 13 is simply lowered along the shaft collar 2 into the casing. Subsequent bolting to the reinforcing member 20 involves no technical difficulty. The procedure for assembling in the oil-filled casing 8 has been described above. When disassembling, the procedure has merely to be reversed and the work is not cumbersome.

Supporting the up-thrust bearing shoes 9 and pilot bearing 16 with the common annular support member 13 reduces the number of parts required within the oil-filled casing 8 and enables the casing to contain a compact mechanism.

Although the present invention has so far been described as applied to a bearing device in which the pilot bearing 16 is integrally provided on the annular support member 13, it is to be noted that induction motors do not necessarily use fixed pilot bearings. Lubrication systems may, in some cases, make it preferable to use a pilot bearing 16 of the movable type.

Figure 5:
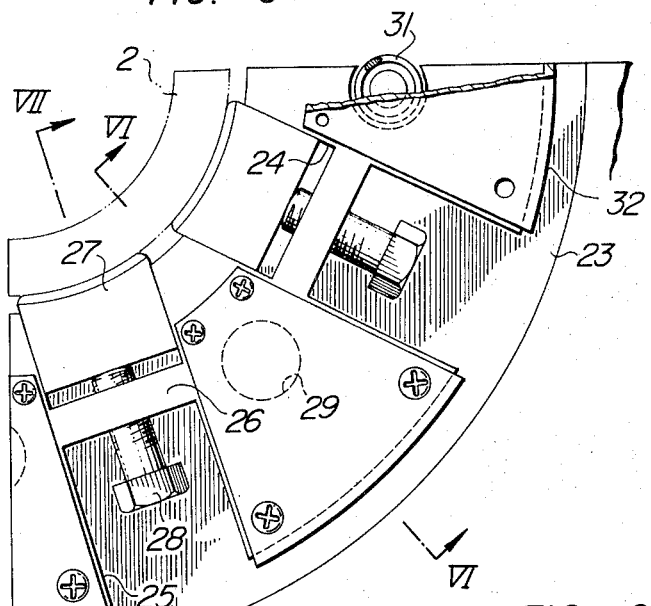
FIG. 5 is a plan view of a part of another pilot bearing according to the invention.
Figure 6:
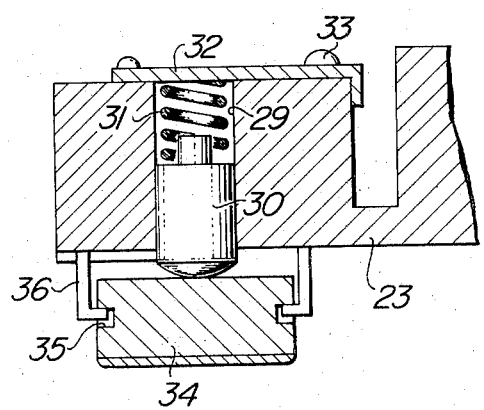
FIG. 6 is a sectional view taken along the line VI—VI of FIG. 5.
Figure 7:
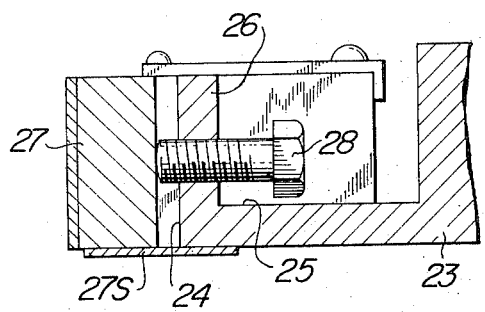
FIG. 7 is a sectional view taken along the line VII—VII of FIG. 5.

With this in view, another embodiment of the invention using a movable pilot bearing will be described below with reference to FIGS. 5 to 7.

The bearing shown here is basically of the same structure as in the preceding embodiment. An annular support member 23 is equidistantly formed with guide slots 24, which are open to the shaft collar 2, with their depth in accord with the radial direction of the support member. The guide slots 24 contain pilot bearing shoes 27 slightly movably in sliding contact with the shaft collar 2. The annular support member 23 is also formed with pits 25 radially outwardly of the guide slots 24, with partition walls 26 in between. Adjusting bolts 28 are screwed from the pits 25 through the walls 26 in such a manner that the front end of each adjusting bolt 28 pushes the back of each associated pilot bearing shoe 27 to adjust the gap between the shoe and the shaft collar 2. Because the guide slots 24 are open axially, a support plate 27S for the pilot bearing shoes 27 closes the lower ends of the slots 24.

In the portions of the annular support member 23 left between the guide slots 24 or pits 25 are formed axial holes 29, each of which contains an axially movable support pin 30 so designed as to be normally protruding at its lower end from the hole 29. A spring 31 is loaded above the support pin 30, and a sector plate 32 is fastened to the support member 23 by set screws 33 to close each hole 29, so that a spring pressure is exerted on the support pin 30. Beneath the support pin 30 is located on of the up-thrust bearing shoes 34 which is kept under pressure by the pin. Each up-thrust bearing shoe 34 is formed with engaging grooves 35 on both sides, which loosely receive the tips of hooks 36 secured at the other ends to the annular support member 23.

In the arrangement described above the pilot bearing shoes 27 and up-thrust bearing shoes 34 are movably supported by the common annular support member 23 in positions adjacent to each other. Therefore, the components may be handled in the same manner as with the first embodiment, and the possibility of shortening the shaft length and the advantages accruable therefrom are the same, too.

While the present invention has been described in connection with a bearing device for a vertical-shaft induction motor for driving a recycling pump installed in the proximity of a nuclear reactor, it is to be understood, of course, that the invention is not limited to an induction motor but is applicable to other motors or rotary machines of vertical shaft type as well.

As stated hereinbefore, up-thrust bearing shoes and a pilot bearing or pilot bearing shoes are supported with a common stationary member and are disposed adjacent to each other in accordance with the present invention. This makes possible the shortening of the shaft length in the bearing device and hence a reduction in the overall size of the rotary machine. In addition, it greatly facilitates disassembling and reassembling and therefore servicing of the bearing device. The labor and time for such purposes are materially saved and the bearing device itself can be made compact in design.

What is claimed is:

1. A bearing device for supporting a vertical rotary shaft of a vertical shaft rotary machine comprising:
   down-thrust bearing shoes for bearing downward thrust forces experienced by the vertical shaft,
   pilot bearing shoes for suppressing radial displacement of the shaft, and
   up-thrust bearing shoes for bearing upward thrust experienced by the shaft, said pilot bearing shoes and up-thrust bearing shoes being supported by a common annular stationary member surrounding the vertical shaft, said up-thrust bearing shoes being equidistantly disposed with respect to one another on the annular member, said pilot bearing shoes being disposed on the annular member between respective ones of the up-thrust bearing shoes.

2. A bearing device according to claim 1, further comprising elastic members supporting the up-thrust bearing shoes on the annular member.

3. A bearing device according to claim 1, wherein the pilot bearing shoes are adjustable in the radial direction with respect to said annular member.

4. A bearing device according to claim 1, wherein the pilot bearing shoes and up-thrust bearing shoes are both supported for movement with respect to said annular member.

5. A bearing device according to claim 4, further comprising elastic members supporting the up-thrust bearing shoes on the annular member.

6. A bearing device according to claim 4, wherein the pilot bearing shoes are adjustable in the radial direction with respect to said annular stationary member.

7. A bearing device for supporting a rotary shaft of a rotary shaft machine comprising:
   pilot bearing shoes for suppressing radial displacement of the shaft, and a first set of thrust bearing shoes for absorbing axial thrust experienced by the shaft, said pilot bearing shoes and said first set of thrust bearing shoes being supported by a common annular member surrounding the rotary shaft and being arranged in such a manner that the first set of thrust bearing shoes include thrust bearing shoes spaced from one another about the circumference of the annular member, said pilot bearing shoes being spaced from one another about the circumference of the annular member at respective positions between respective thrust bearing shoes of the first set of thrust bearing shoes.

8. A bearing device according to claim 7, wherein the annular member is stationary.

9. A bearing device according to claim 7, wherein the thrust bearing shoes are equidistantly spaced from one another about the annular member.

10. A bearing device according to claim 8, wherein the thrust bearing shoes are equidistantly spaced from one another about the annular member.

11. A bearing device for supporting a rotary shaft of a rotary shaft machine comprising:
    pilot bearing shoes for suppressing radial displacement of the shaft, and
    adjustment means for radially adjusting said pilot bearing shoes with respect to said shaft.

12. A bearing device according to claim 11, wherein said pilot bearing shoes are supported at an annular stationary member surrounding the shaft by way of said adjustment means.

13. A bearing device for supporting a vertical rotary shaft of a rotary shaft maching comprising:
    down-thrust bearing shoes for bearing downward thrust experienced by the shaft, pilot bearing shoes for suppressing radial displacement of the vertical shaft, and up-thrust bearing shoes separate from said pilot bearing shoes for bearing upward thrust experienced by the shaft, wherein said pilot bearing shoes and up-thrust bearing shoes are supported by a common annular stationary member and wherein said up-thrust bearing shoes are urged downwardly by resilient members arranged above the lower ends of said pilot bearing shoes.

14. A bearing device according to claim 13, wherein the pilot bearing shoes are located along the inner periphery of the annular stationary member.

15. A bearing device according to claim 13, wherein pits for accommodating said resilient members are formed in said annular stationary member.

16. A bearing device for supporting a rotary shaft of a rotary shaft machine comprising:
at least one set of thrust bearing shoes for bearing axially directed thrust forces experienced by the shaft, and
pilot bearing shoes for suppressing radial displacement of the shaft, said thrust bearing shoes being disposed about the rotary shaft at a plurality of locations, said pilot bearing shoes also being disposed about the rotary shaft at a plurality of locations between respective locations of the thrust bearing shoes.

17. A bearing device according to claim 16, wherein the thrust bearing shoes are disposed equidistantly with respect to one another about the rotary shaft.

* * * * *